(12) United States Patent
Blanz et al.

(10) Patent No.: US 6,556,196 B1
(45) Date of Patent: Apr. 29, 2003

(54) METHOD AND APPARATUS FOR THE PROCESSING OF IMAGES

(75) Inventors: Volker Blanz, Tübingen (DE); Thomas Vetter, Freiburg (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 09/527,158

(22) Filed: Mar. 17, 2000

(30) Foreign Application Priority Data

Mar. 19, 1999 (EP) .............................................. 99105692

(51) Int. Cl.$^7$ .............................................. G06T 15/00
(52) U.S. Cl. ...................... 345/419; 345/646; 345/441; 382/154
(58) Field of Search ................................ 345/419, 418, 345/646, 643, 581, 138, 441; 382/154

(56) References Cited

U.S. PATENT DOCUMENTS

| | | | | |
|---|---|---|---|---|
| 5,844,573 A | * | 12/1998 | Poggio et al. | 345/441 |
| 5,990,901 A | * | 11/1999 | Lawton et al. | 345/581 |
| 6,020,892 A | * | 2/2000 | Dillon | 345/419 |
| 6,147,692 A | * | 11/2000 | Shaw et al. | 345/643 |
| 6,366,281 B1 | * | 4/2001 | Lipton et al. | 345/419 |
| 6,268,846 B1 | * | 7/2001 | Georgiev | 345/138 |
| 6,320,583 B1 | * | 11/2001 | Shaw et al. | 345/643 |
| 6,362,833 B2 | * | 3/2002 | Trika | 345/646 |

OTHER PUBLICATIONS

Akimoto, Takaaki et al., "Automatic Creation of 3D Facial Models", IEEE Computer Graphics & Applications, 13(3):16–22, 1993.

Beymer, David and Poggio, Tomaso, "Image Representations for Visual Learning", Science, 272:1905–1909, 1996.

Beymer, D. et al., "Example–Based Image Analysis and Synthesis", A.I. Memo No. 1431, Artificial Intelligence Laboratory, Massachusetts Institute of Technology, 1993.

Choi, Chang Seok et al., "A System of Analyzing and Synthesizing Facial Images", In Proc. IEEE Int. Symposium of Circuit and Systems, (ISCAS91), pp. 2665–2668, 1991.

Cootes, T.F. et al., "Active Appearance Models", In Burkhardt and Neumann, Editors, Computer Vision—ECCV '98 vol. II, Freiburg, Germany, 1998, Springer, Lecture Notes in Computer Science 1407.

DeCarolo, Douglas et al., "An Anthropometric Face Model Using Variational Techniques", In Computer Graphics Proceedings SIGGRAPH '98, pp. 67–74, 1998.

Edwards, G.J. et al., "Modelling the Variability in Face Images", In Proc. of the 2$^{nd}$ Int. Conf. on Automatic Face and Gesture Recognition, IEEE Comp. Soc., Press, Los Alamitos, CA, 1996.

Guenter, Brian et al., "Making Faces", In Computer Graphics Proceedings SIGGRAPH '98, pp. 55–66, 1998.

(List continued on next page.)

Primary Examiner—Mark Zimmerman
Assistant Examiner—Huedung X. Cao
(74) Attorney, Agent, or Firm—Piper Rudnick LLP

(57) ABSTRACT

A method of processing an image of a three-dimensional object, including the steps of providing a morphable object model derived from a plurality of 3D images, matching the morphable object model to at least one 2D object image, and providing the matched morphable object model as a 3D representation of the object. A method of generating a morphable object model includes the steps of generating a 3D database comprising a plurality of 3D images of prototype objects, subjecting the data of the 3D database to a data processing providing correspondences between the prototype objects and at least one reference object, and providing the morphable object model as a set of objects comprising linear combinations of the shapes and textures of the prototype objects.

7 Claims, 4 Drawing Sheets

OTHER PUBLICATIONS

Jones, Michael J. and Poggio, Tomaso, "Multidimensional Morphable Models: A Framework for Representing and Matching Object Classes", In Proceedings of the Sixth International Conference on Computer Vision, Bombay, India, 1998.

Lanitis, Andreas et al., "Automatic Interpretation and Coding of Face Images Using Flexible Models", IEEE Transactions on Pattern Analysis and Machine Intelligence, 19(7):743–756, 1997.

Lee, Yuencheng et al., "Realistic Modeling for Facial Animation", In SIGGRAPH '95 Conference Proceedings, pp. 55–62, Los Angeles, 1995, ACM.

Pighin, Frédéric et al., "Synthesizing Realistic Facial Expressions from Photographs", In Computer Graphics Proceedings SIGGRAPH '98, pp. 75–84, 1998.

Platt, Stephen M. and Badler, Norman I., "Animating Facial Expressions", Computer Graphics, 15(3):245–252, 1981.

Sannier, Gaël and Thalmann, Nadia Magnenat, "A User–Friendly Texture–Fitting Methodology for Virtual Humans", In Computer Graphics International '97, 1997.

Vetter, Thomas and Blanz, Volker, "Estimating Coloured 3D Face Models from Single Images: An Example Based Approach", In Burkhardt and Neumann, editors, Computer Vision –ECCV'98 vol. II, Freiburg, Germany, 1998, Springer, Lecture Notes in Computer Science 1407.

Vetter, Thomas et al., "A Bootstrapping Algorithm for Learning Linear Models of Object Classes", In IEEE Conference on Computer Vision and Pattern Recognition—CVPR '97, Puerto Rico, USA, 1997, IEEE Computer Society Press.

Vetter, Thomas and Poggio, Tomaso, "Linear Object Classes and Image Synthesis from a Single Example Image", IEEE Transactions on Pattern Analysis and Machine Intelligence, 19(7):733–742, 1997.

Waters, Keith, "A Muscle Model for Animating Three–Dimensional Facial Expression", Computer Graphics, 22(4):17–24, 1987.

Moccozet, Laurent and Thalmann, Nadia Magnenat, "Computer Animation '97 Dirichlet Free–Form Deformations and their Application to Hand Simulation", in MIRALab Copyright© Information 1998.

Bergen, J.R. and Hingorani, R., "Hierarchical Motion–Based Frame Rate Conversion", pp. 1–15.

Koch, Rolf M. et al., "Emotion Editing using Finite Elements", in EUROGRAPHICS '98, vol. 17, (1998), No. 3.

Sirovich, L. and Kirby, M., "Low–Dimensional Procedure for the Characterization of Human Faces", vol. 4, No. 3, Mar. 1987/J. Opt. Soc. Am. A, pp. 519–524.

IEEE Computer Society, 1997.

Strub, Lyle and Robinson, John, "Automated Facial Conformation for Model–Based Videophone Coding", Proceedings of the International Conference on Image Processing (ICIP), Washington, Oct. 23–26, 1995, vol. 2, pp. 587–590.

Reinders, M.J.T. et al., "Facial Feature Localization and Adaptation of a Generic Face Model for Model–Based Coding", Signal Processing Image Communication, vol. 7, No. 1, Mar. 1995, pp. 57–74.

* cited by examiner

METHOD AND APPARATUS FOR THE PROCESSING OF IMAGES

FIELD OF THE INVENTION

This invention relates to a method for image processing, in particular to the manipulation (detecting, recognizing and/or synthesizing) of images of three-dimensional objects, such as human faces, on the basis of a morphable model for image synthesis. Furthermore, the invention relates to an image processing system for implementing such a method.

BACKGROUND

One field of image manipulation concerns particularly the manipulation of human faces. Modeling human faces has challenged researchers in computer graphics since its beginning. Since the pioneering work of Parke [see ref. numbers 23 and 24 and the list of numbered references at the end of this specification], various techniques have been reported for modeling the geometry of faces [ref. numbers 9, 10, 20, 31, 19] and for animating them [ref. numbers 26, 13, 17, 29, 20, 35, 27]. A detailed overview can be found in the book of Parke and Waters [22].

The techniques developed for the animation of faces can be roughly separated in those that rely on physical modeling of facial muscles [35], and in those applying previously captured facial expressions to a face [23, 2]. These performance based animation techniques compute the correspondence between the different facial expressions of a person by tracking markers glued to the face from image to image. To obtain photo-realistic face animations, a high number of markers (e.g. up to 182 markers) have to be used [13].

Computer aided modeling of human faces still requires a great deal of expertise and manual control to avoid unrealistic, non-face-like results. Most limitations of automated techniques for face synthesis, face animation or for general changes in the appearance of an individual face can be described either as the problem of finding corresponding feature locations in different faces or as the problem of separating realistic faces from faces that could never appear in the real world. The correspondence problem is crucial for all morphing techniques, both for the application of motion-capture data to pictures or 3D face models, and for most 3D face reconstruction techniques from images. A limited number of labeled feature points marked in one face, e.g., the tip of the nose, the corner of the eye and less prominent points on the cheek, must be located precisely in another face. The number of manually labeled feature points varies from application to application, but usually ranges from 50 to 300. Only a correct alignment of all these points allows acceptable intermediate morphs, a convincing mapping of motion data from the reference to a new model, or the adaptation of a 3D face model to 2D images for 'video cloning'. Human knowledge and experience is necessary to compensate for the variations between individual faces and to guarantee a valid location assignment in the different faces. At present, automated matching techniques can be utilized only for very prominent feature points such as the corners of eyes and mouth.

A second type of problem in face modeling is the separation of natural faces from non faces. For this, human knowledge is even more critical. Many applications involve the design of completely new natural looking faces that can occur in the real world but which have no "real" counterpart. Others require the manipulation of an existing face according to changes in age, body weight or simply to emphasize the characteristics of the face. Such tasks usually require time-consuming manual work combined with the skills of an artist.

It is accordingly an object of the invention to provide improved image processing methods and systems capable of meeting the above problems, which particularly process images of three-dimensional objects in a more flexible and effective manner.

SUMMARY OF THE INVENTION

According to the invention, a parametric face modeling technique assists in solving both of the above problems. First, arbitrary human faces can be created simultaneously controlling the likelihood of the generated faces. Second, the system is able to compute correspondence between new faces. Exploiting the statistics of a large data set of 3D face scans (geometric and textural data, Cyberware™) a morphable face model has been built which allows to recover domain knowledge about face variations by applying pattern classification methods. The morphable face model is a multidimensional 3D morphing function that is based on the linear combination of a large number of 3D face scans. Computing the average face and the main modes of variation in the dataset, a probability distribution is imposed on the morphing function to avoid unlikely faces. Also, parametric descriptions of face attributes such as gender, distinctiveness, "hooked" noses or the weight of a person, have been derived by evaluating the distribution of exemplar faces for each attribute within our face space.

Having constructed a parametric face model that is able to generate almost any face, the correspondence problem turns into a mathematical optimization problem. New faces, images or 3D face scans, can be registered by minimizing the difference between the new face and its reconstruction by the face model function. An algorithm has been developed that adjusts the model parameters automatically for an optimal reconstruction of the target, requiring only a minimum of manual initialization. The output of the matching procedure is a high quality 3D face model that is in full correspondence with the morphable face model. Consequently, all face manipulations parameterized in the model function can be mapped to the target face. The prior knowledge about the shape and texture of faces in general that is captured in our model function is sufficient to make reasonable estimates of the full 3D shape and texture of a face even when only a single picture is available. When applying the method to several images of a person, the reconstructions reach almost the quality of laser scans.

A key part of the invention is a generalized model of human faces. Similar to the approach of DeCarlos et al. [9], the range of allowable faces according to constraints derived from prototypical human faces is restricted. However, instead of using a limited set of measurements and proportions between a set of facial landmarks, the densely sampled geometry of the exemplar faces obtained by laser scanning (Cyberware™) are directly used. The dense modeling of facial geometry (several thousand vertices per face) leads directly to a triangulation of the surface. Consequently, there is no need for variational surface interpolation techniques [9, 21, 30]. The inventors also added a model of texture variations between faces. The morphable 3D face model is a consequent extension of the interpolation technique between face geometries, as introduced by Parke [24]. Computing correspondence between individual 3D face data automatically, the invention enables increasing the number of vertices used in the face representation from a few hundreds to tens of thousands.

Moreover, a higher number of faces can be used and thus, between hundreds of 'basis' faces rather than just a few can be interpolated. The goal of such an extended morphable face model is to represent any face as a linear combination of a limited basis set of face prototypes. Representing the face of an arbitrary person as a linear combination (morph) of "prototype" faces was first formulated for image compression in telecommunications [7]. Image-based linear 2D face models that exploit large data sets of prototype faces were developed for face recognition and image coding [3, 16, 34].

Different approaches have been taken to automate the matching step necessary for building up morphable models. One class of techniques is based on optical flow algorithms [4, 3] and another on an active model matching strategy [11, 15]. Combinations of both techniques have been applied to the problem of image matching [33]. According to the invention, an extension of this approach to the problem of matching 3D faces has been obtained.

The corresponding problem between different three-dimensional face data has been addressed previously by Lee et al.[18]. Their shape-matching algorithm differs significantly from the invention in several respects. First, the correspondence is computed in high resolution, considering shape and texture data simultaneously. Second, instead of using a physical tissue model to constrain the range of allowed mesh deformations, the statistics of example faces are used to keep deformations plausible. Third, the system of the invention does not rely on routines that are specifically designed to detect the features exclusively found in human faces, e.g., eyes, nose and the like.

The matching strategy of the invention can be used not only to adapt the morphable model to a 3D face scan, but also to 2D images of faces. Unlike a previous approach [32], the morphable 3D face model is now directly matched to images, avoiding the detour of generating intermediate 2D morphable image models. As an advantageous consequence, head orientation, illumination conditions and other parameters can be free variables subject to optimization. It is sufficient to use rough estimates of their values as a starting point of the automated matching procedure.

Most techniques for 'face cloning', the reconstruction of a 3D face model from one or more images, still rely on manual assistance for matching a deformable 3D face model to this the images [24, 1, 28]. The approach of Pighin et al. [26] demonstrates the high realism that can be achieved for the synthesis of faces and facial expressions from photographs where several images of a face are matched to a single 3D face model. The automated matching procedure of the invention can be used to replace the manual initialization step, where several corresponding features have to be labeled in the presented images.

One particular advantage of the invention is that it works directly on faces without manual markers. In the automated approach the number of markers is extended to its limit. It matches the full number of vertices available in the face model to images. The resulting dense correspondence fields can even capture changes in wrinkles and map these from one face to another.

The invention teaches a new technique for modeling textured 3D faces. 3D faces can either he generated automatically from one or more photographs, or modeled directly through an intuitive user interface. Users are assisted in two key problems of computer aided face modeling. First, new face images or new 3D face models can be registered automatically by computing dense one-to-one correspondence to an internal face model. Second, the approach regulates the naturalness of modeled faces avoiding faces with an "unlikely" appearance.

Applications of the invention are in particular in the fields of facial modeling, registration. photogrammetry, morphing, facial animation, computer vision and the like.

BRIEF DESCRIPTION OF THE DRAWINGS

Further advantages and details of the invention are described with reference to the attached drawings, which show.

DETAILED DESCRIPTION OF THE INVENTION

Figure 1:
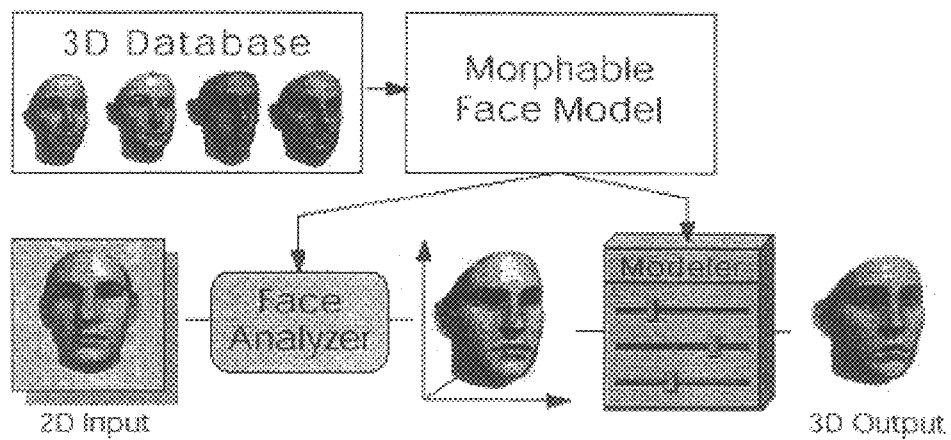
FIG. 1: a schematic representation of basic aspects of the invention.

The following description is intended to refer to specific embodiments of the invention illustrated in the drawings and is not intended to define or limit the invention, other than in the appended claims. Also, the drawings are not to scale and various dimensions and proportions are contemplated.

As illustrated in FIG. 1, starting from an example set of 3D face models, a morphable face model is derived by transforming the shape and texture of the examples into a vector space representation. The morphable face model contributes to two main steps in face manipulation: (1) deriving a 3D face model from a novel image, and (2) modifying shape and texture in a natural way. New faces and expressions can be modeled by forming linear combinations of the prototypes. Shape and texture constraints derived from the statistics of our example faces are used to guide manual modeling or automated matching algorithms. 3D face reconstructions from single images and their applications for photo-realistic image manipulations can be obtained. Furthermore, face manipulations according to complex parameters such as gender, fullness of a face or its distinctiveness are demonstrated.

The further description is structured as follows. It starts with a description (I) of the database of 3D face scans from which our morphable model is built. In the following section (II), the concept of the morphable face model is introduced, assuming a set of 3D face scans that arc in full correspondence. Exploiting the statistics of a dataset, a parametric description of faces is derived, as well as the range of plausible faces. Additionally, facial attributes from the labeled data set to the parameter space of the model are mapped. In section III, a method for matching the flexible model of the invention to novel images or 3D scans of faces is described. Along with a 3D reconstruction, the method can compute correspondence, based on the morphable model. Section IV describes an iterative method for building a morphable model automatically from a raw data set of 3D face scans when no correspondences between the exemplar faces are available. Finally, applications of the technique to novel images will be shown.

The description of the method according to the invention refers generally to the attached figures. It is emphasized that the figures herein are not capable of reflecting the high quality of the images obtained by the invention for printing reasons.

I Database

Laser scans (Cyberware™) of 200 heads of young adults (100 male and 100 female) were used. The laser scans provided head structure data in a cylindrical representation, with radii $r(h, \phi)$ of surface points sampled at 512 equally-spaced angles $\phi$ and at 512 equally spaced vertical steps h. Additionally, the RGB-color values $R(h, \phi)$, $G(h, \phi)$, and $B(h,\phi)$, were recorded in the same spatial resolution and were stored in a texture map with 8 bit per channel.

All faces were without makeup, accessories, and facial hair. The subjects were scanned wearing bathing caps, that were removed digitally. Additional automatic pre-processing of the scans, which for most heads required no human interaction, consisted of a vertical cut behind the ears, a horizontal cut to remove the shoulders, and a normalization routine that brought each face to a standard orientation and position in space. The resultant faces were represented by approximately 70,000 vertices and the same number of color values.

II Morphable 3D Face Model

The morphable model is based on a data set of 3D faces. Morphing between faces requires full correspondence between all of the faces. In this section, it is assumed that all exemplar faces are in full correspondence. The algorithm for computing correspondence will be described in Section IV.

We represent the geometry of a face with a shape-vector $S=(X_1, Y_1, Z_1, X_2, \ldots, Y_n, Z_n)^T \in \Re^{3n}$, that contains the X, Y, Z-coordinates of its n vertices. For simplicity, we assumed that the number of valid texture values in the texture map is equal to the number of vertices. We, therefore, represent the texture of a face by a texture-vector $T=(R_1, G_1, B_1, R_2, \ldots, G_n, B_n)^T \in \Re^{3n}$, that contains the R, G, B color values of the n corresponding vertices. A morphable face model was then constructed using a data set of m exemplar faces, each represented by its shape-vector $S_i$ and texture-vector $T_i$. Since we assumed all faces in full correspondence (see Section IV), new shapes $S_{model}$ and new textures $T_{model}$ can be expressed in barycentric coordinates as a linear combination of the shapes and textures of the m exemplar faces:

$$S_{mod} = \sum_{i=1}^{m} a_i S_i, \quad T_{mod} = \sum_{i=1}^{m} b_i T_i, \quad \sum_{i=1}^{m} a_i = \sum_{i=1}^{m} b_i = 1$$

We define the morphable model as the set of faces ($S_{mod}(\vec{a})$, $T_{mod}(\vec{b})$), parameterized by the coefficients $\vec{a}=(a_1, a_2 \ldots a_m)^T$ and $\vec{b}=(b_1, b_2 \ldots, b_m)^T$. (Standard morphing between two faces (m=2) is obtained if the parameters $a_1$, $b_1$ are varied between 0 and 1, setting $a_2=1-a_1$ and $b_2=1-b_1$).

Arbitrary new faces can be generated by varying the parameters $\vec{a}$ and $\vec{b}$ that control shape and texture.

For a useful face synthesis system, it is important to be able to quantify the results in terms of their plausibility of being faces. We, therefore, estimated the probability distribution for the coefficients $a_i$ and $b_i$ from our example set of faces. This distribution enables us to control the likelihood of the coefficients $a_i$ and $b_i$ and quently regulates the likelihood of the appearance of the generated faces.

We fit a multivariate normal distribution to our data Set of 200 faces based on the averages of shape $\overline{S}$ and texture $\overline{T}$ and the covariance matrices $C_S$ and $C_T$ computed over the shape and texture differences $\Delta S_i = S_i - \overline{S}$ and $\Delta T_i = T_i - \overline{T}$.

A common technique for data compression known as Principal Component Analysis (PCA) [14] performs a basis transformation to an orthogonal coordinate system formed by the eigenvectors $s_i$ and $t_i$ of the covariance matrices (in descending order according to their eigenvalues):

$$S_{model} = \overline{S} + \sum_{i=1}^{m-1} \alpha_i s_i, \quad T_{model} = \overline{T} + \sum_{i=1}^{m-1} \beta_i t_i, \quad (1)$$

$\vec{\alpha}, \vec{\beta} \in \Re^{m-1}$. The probability for coefficients $\vec{\alpha}$ is given by $$p(\vec{\alpha}) \sim \exp\left[-\frac{1}{2}\sum_{i=1}^{m-1} (\alpha_i/\sigma_i)^2\right], \quad (2)$$

with $\sigma_i^2$ being the eigenvalues of the shape covariance matrix $C_S$. The probability $\sim p(\vec{\beta})$ is computed similarly.

Segmented miorphable model: The morphable model described in equation (1), has m−1 degrees of freedom for texture and m−1 for shape. The expressiveness of the model can be increased by dividing faces into independent subregions that are morphed independently, for example, into eyes, nose, mouth and a surrounding region (see FIG. 2).

Figure 2:
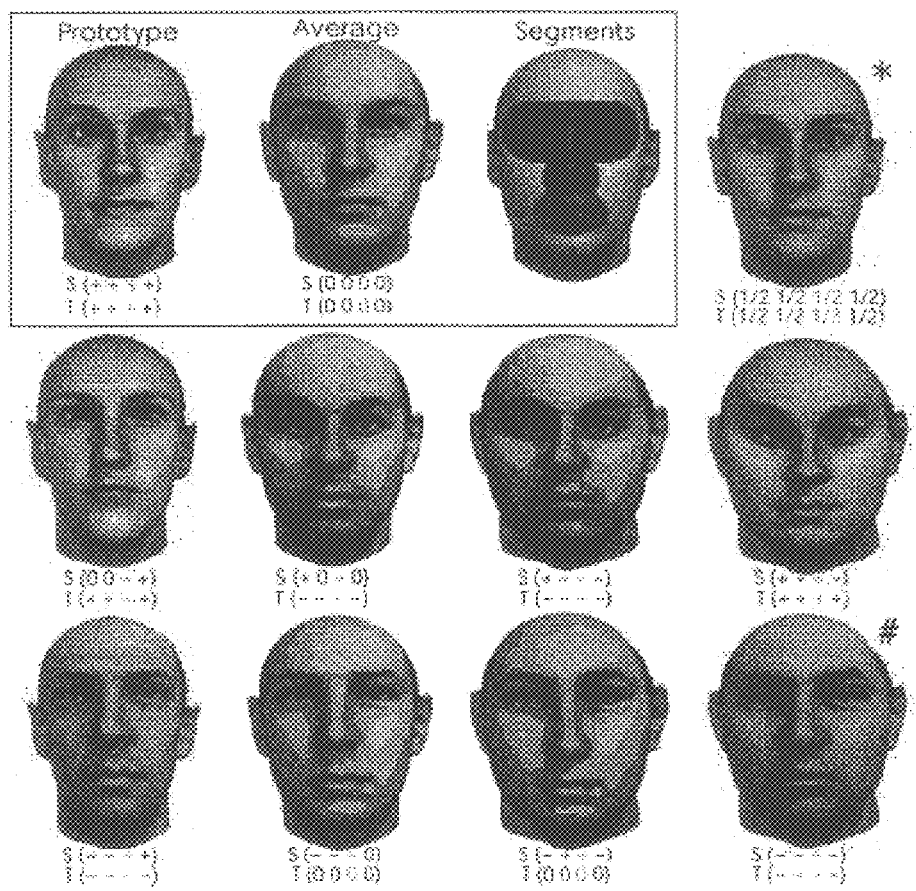
FIG. 2: an illustration of face synthesis on the basis of the morphable model.

According to FIG. 2, a single prototype adds a large variety of new faces to the morphable model. The deviation of the prototype from the average is added (+) or subtracted (−) from the average. A standard morph (*) is located halfway between the average and the prototype. Substracting the differences from the average yields an "anti"-face (#). Adding and substracting deviations independently from shape (S) and texture (T) on each of four segments produces a number of distinct faces.

Since all faces are assumed to be in correspondence, it is sufficient to define these regions on a reference face. This segmentation is equivalent to subdividing the vector space of faces into independent subspaces. A complete 3D face is generated by computing linear combinations for each segment separately and blending them at the borders according to an algorithm proposed for images by [6].

II.1 Facial Attributes

Shape and texture coefficients $a_i$ and $b_i$ in our morphable face model do not correspond to the facial attributes used in human language. While some facial attributes can easily be related to biophysical measurements [12, 9], such as the width of the mouth, others such as facial femininity or being more or less bony can hardly be described by numbers. In this section, a method for mapping facial attributes is described, defined by a hand-labeled set of example faces, to the parameter space of our morphable model. At each position in face space (that is for any possible face), we define shape and texture vectors that, when added to or subtracted from a face, will manipulate a specific attribute while keeping all other attributes as constant as possible.

In this framework, changes in facial expression generated by performance based techniques [23] can be transferred by adding the differences between two expressions of the same individual, $\Delta S = S_{expression} - S_{neutral}$, $\Delta T = T_{expression} - T_{neutral}$, to a different individual in a neutral expression.

Figure 3:
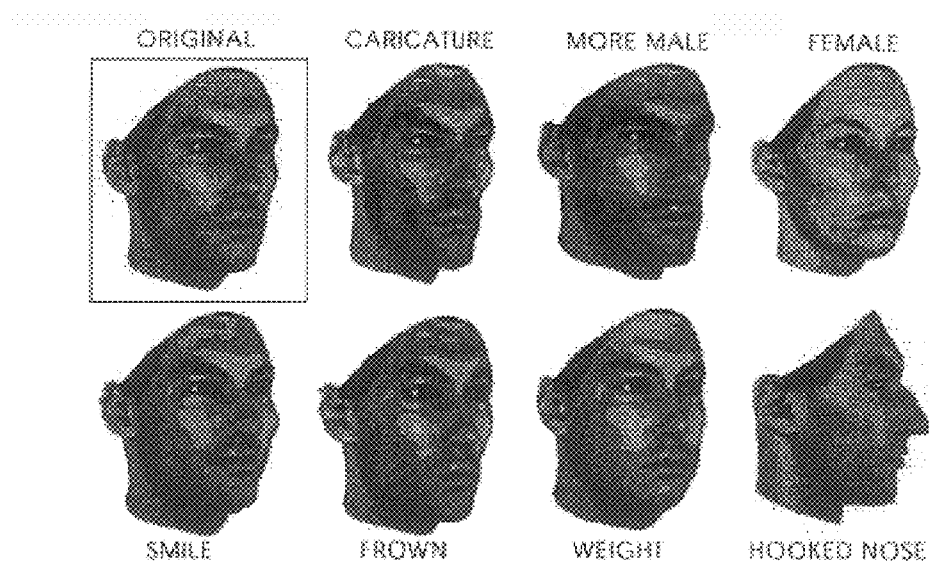
FIG. 3: an illustration of the variation of facial attributes of a single face.

Unlike facial expressions, attributes that are invariant for each individual are more difficult to isolate. The following method allows to model facial attributes such as gender, fullness of faces, darkness of eyebrows, double chins, and hooked versus concave noses (FIG. 3). FIG. 3 illustrates the variation of facial attributes of a single face. The appearance of an original face (with frame) can be changed or substracting shape and texture vectors specific to the attributes.

Based on a set of faces $(S_i, T_i)$ with manually assigned labels $\mu_i$ describing the markedness of the attribute, we compute weighted sums $$\Delta S = \sum_{i=1}^{m} \mu_i (S_i - \overline{S}), \quad \Delta T = \sum_{i=1}^{m} \mu_i (T_i - \overline{T}), \quad \sum_{i=1}^{m} \mu_i = 0. \quad (3)$$

Multiples of $(\Delta S, \Delta T)$ can now be added to or subtracted from any individual face. For binary attributes, such as gender, setting $\mu_A = 1/m_A$ for faces in class A, and $\mu_B = -1/m_B$ for those in B, Eq. (3) yields the difference between the averages of class A and B.

$$\left( \Delta s = \sum_{i=1}^{m_A} \frac{1}{m_A} (S_{A,i} - \overline{S}) + \sum_{i=1}^{m_B} \frac{-1}{m_B} (S_{B,i} - \overline{S}) = \frac{1}{m_A} \sum_{i=1}^{m_A} S_{A,i} - \frac{1}{m_B} \sum_{i=1}^{m_B} S_{B,i} \right)$$

To justify this method, let $\mu(S, T)$ be the overall function describing the markedness of the attribute in a face $(S, T)$. Since $\mu(S, T)$ is not available per se for all $(S, T)$, the regression problem of estimating $\mu(S, T)$ from a sample set of labeled faces has to be solved. The present technique assumes that $\mu(S, T)$ is a linear function. Consequently, to achieve a change $\Delta \mu$ of the attribute, there is a single optimal direction $(\Delta S, \Delta T)$ for the whole space of faces. It can be shown that Equation (3) yields the direction with minimal variance-normalized length $$\|\Delta S\|^2_M = (\Delta S, C_S^{-1} \Delta S), \|\Delta T\|^2_M = (\Delta T, C_T^{-1} \Delta T).$$

A different kind of facial attribute is its "distinctiveness", which is commonly manipulated in caricatures. The automated production of caricatures has been possible for many years [5]. This technique can easily be extended from 2D images to the present morphable face model. Individual faces are caricatured by increasing their distance from the average face. In our representation, shape and texture coefficients $a_i, \beta_i$ are simply multiplied by a constant factor.

III Matching a Morphable Model to Images

An aspect of the invention is an algorithm for automatically matching the morphable face model to one or more images. Providing an estimate of the face's 3D structure (FIG. 4), it closes the gap between the specific manipulations described in Section II.1, the type of data available in typical applications.

Figure 4:
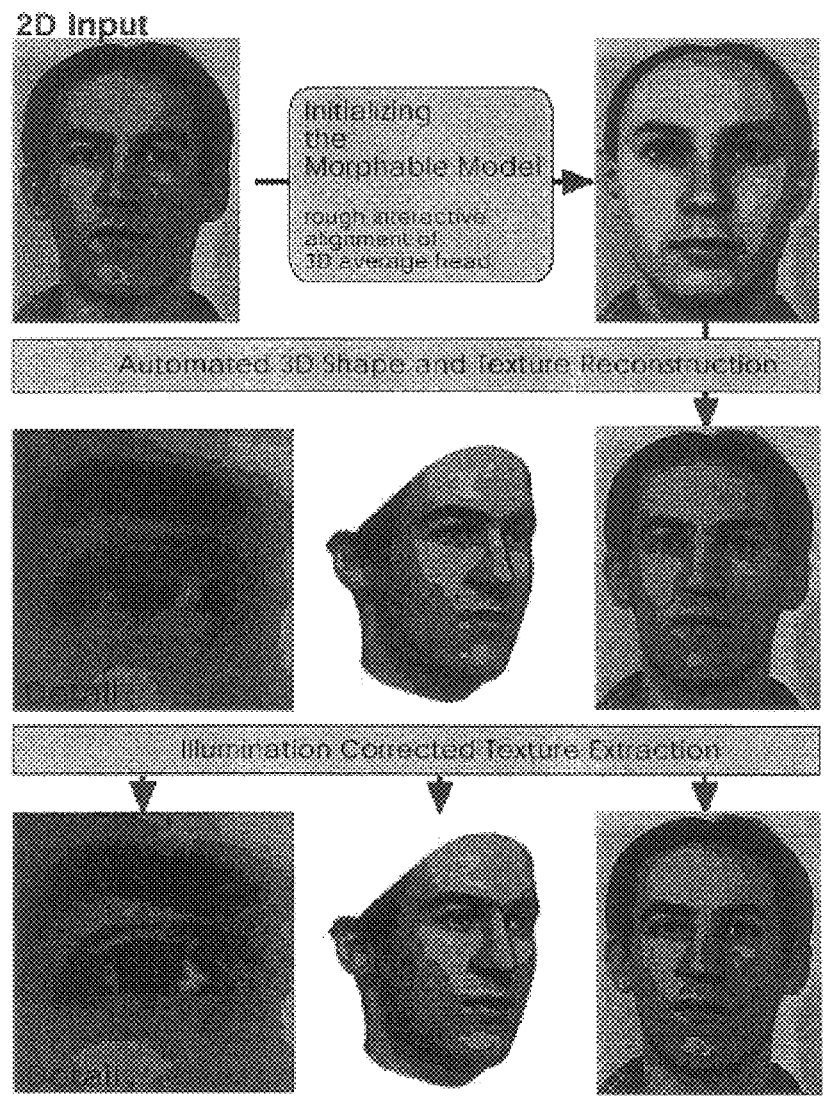
FIG. 4: a flow chart illustrating the processing steps for reconstructing 3D shape and texture of a new face from a single image.

The processing step for reconstructing 3D shape and texture of a new face from a single image are illustrated in the flow chart of FIG. 4. After a rough manual alignment of the averaged 3D head (top row) the automated matching procedure fits the 3D morphable model to the image (center row). In the right column, the model is rendered on top of the input image. Details in texture can be improved by illumination-corrected texture extraction from the input (bottom row). This correction comprises a back-projection of the generated image to the input image with an illumination correction. The color information from the original image is used for correcting the generated image. This illumination-correction by back-protection represents an important and advantageous feature of the invention.

Coefficients of the 3D model are optimized along with a set of rendering parameters such that they produce an image as close as possible to the input image. In an analysis-by-synthesis loop, the algorithm creates a texture mapped 3D face from the current model parameters, renders an image, and updates the parameters according to the residual difference. It starts with the average head and with rendering parameters roughly estimated by the user.

Model Parameters: Facial shape and texture are defined by coefficients $\alpha_j$ and $\beta_j$, $j = 1, \ldots, m-1$ (Equation 1).

Rendering parameters $\vec{\rho}$ depend on the application and contain camera position (azimuth and elevation), object scale, image plane rotation and translation, intensity $i_{r,amb}$, $i_{g,amb}$, $i_{b,amb}$ of ambient light, and/or intensity $i_{r,dir}$, $i_{g,dir}$, $i_{b,dir}$ of directed light. In order to handle photographs taken under a wide variety of conditions, $\vec{\rho}$ also includes color contrast as well as offset and gain in the red, green, and blue channel.

Other parameters, such as camera distance, light direction, and surface shininess, remain fixed to the values estimated by the user.

From parameters $\vec{\alpha}, \vec{\beta}, \vec{\rho}$, colored images $$I_{model}(x, y) = (I_{r,mod}(x, y), I_{g,mod}(x, y), I_{b,mod}(x, y))^T \quad (4)$$

are rendered using perspective projection and the Phong illumination model. The reconstructed image is supposed to be closest to the input image in terms of Euclidean distance $$E_I = \Sigma_{x,y} \|I_{input}(x, y) - I_{model}(x, y)\|^2.$$

Matching a 3D surface to a given image is an ill-posed problem. Along with the desired solution, many non-face-like surfaces lead to the same image. It is, therefore, essential to impose constraints on the set of solutions. It is an essential advantage of the invention that in the present morphable model, shape and texture vectors are restricted to the vector space spanned by the database. Accordingly, non-face-like surfaces can be completely avoided.

Within the vector space of faces, solutions can be further restricted by a tradeoff between matching quality and prior probabilities, using $P(\vec{\alpha})$, $P(\vec{\beta})$ from Section 3 and an ad-hoc estimate of $P(\vec{\rho})$. In terms of Bayes decision theory, the problem is to find the set of parameters $(\vec{\alpha}, \vec{\beta}, \vec{\rho})$ with maximum posterior probability, given an image $I_{input}$. While $\vec{\alpha}, \vec{\beta}$, and rendering parameters $\vec{\rho}$ completely determine the predicted image $I_{model}$, the observed image $I_{input}$ may vary due to noise. For Gaussian noise with a standard deviation $s_N$, the likelihood to observe $I_{input}$ is $p(I_{input} | \vec{\alpha}, \vec{\beta}, \vec{\rho}) \sim \exp[-1/2 s^2_N \cdot E_I]$. Maximum posterior probability is then achieved by minimizing the cost function $$E = \frac{1}{\sigma_N^2} E_I + \sum_{j=1}^{m-1} \frac{\alpha_j^2}{\sigma_{S,j}^2} + \sum_{j=1}^{m-1} \frac{\beta_j^2}{\sigma_{T,j}^2} + \sum_j \frac{(\rho_j - \overline{\rho_j})^2}{\sigma_{\rho,j}^2} \quad (5)$$

The optimization algorithm described below uses an estimate of E based on a random selection of surface points. Predicted color values $I_{model}$ are easiest to evaluate in the centers of triangles. In the center of triangle k, texture $(\overline{R}_k,$ $\overline{G}_k, \overline{B}_k)^T$ and 3D location $(\overline{X}_k, \overline{Y}_k, \overline{Z}_k)^T$ are averages of the values at the corners. Perspective projection maps these points to image locations $(\overline{P}_{x,k}, \overline{P}_{y,k})^T$. Surface normals $n_k$ of each triangle k are determined by the 3D locations of the corners. According to Phong illumination, the color components $I_{r,model}, I_{g,model}$ and $I_{b,model}$ take the form $$I_{r,model,k} = (i_{r,amb} + i_{r,dir} \cdot (n_k l)) \overline{R}_k + i_{r,dir} \cdot s \cdot (r_k v_k)^n \quad (6)$$

where I is the direction of illumination, $v_k$ the normalized difference of camera position and the position of the triangle's center, and $r_k = 2(nI)n - I$ the direction of the reflected ray. s denotes surface shininess, and n controls the angular distribution of the specular reflection. Equation (6) reduces to $I_{r,model,k} = i_{r,amb} R_k$ if a shadow is cast on the center of the triangle, which is tested in a method described below.

For high resolution 3D meshes, variations in $I_{model}$ across each triangle $k \in \{1, \ldots, n_t\}$ are small, so $E_I$ may be approximated by $$E_I \approx \sum_{k=1}^{n_t} a_k \cdot \|I_{input}(\overline{P}_{x,k}, \overline{P}_{y,k}) - I_{model,k}\|^2,$$

where $a_k$ is the image area covered by triangle k. If the triangle is occluded, $a_k = 0$.

In gradient descent, contributions from different triangles of the mesh would be redundant. In each iteration, we, therefore, select a random subset $K \subset \{1, \ldots, n_t\}$ of 40 triangles k and replace $E_I$ by $$E_K = \sum_{k \in K} \|I_{input}(\overline{P}_{x,k}, \overline{P}_{y,k}) - I_{model,k}\|^2. \quad (7)$$

The probability of selecting k is $p(k \subset K) \sim a_k$. This method of stochastic gradient descent [15] is not only more efficient computationally, but also helps to avoid local minima by adding noise to the gradient estimate.

Before the first iteration, and once every 1000 steps, the method computes the full 3D shape of the current model, and 2D positions $(p_x, p_y)^T$ of all vertices. It then determines $a_k$, and detects hidden surfaces and cast shadows in a two-pass z-buffer technique. We assume that occlusions and cast shadows are constant during each subset of iterations.

Parameters are updated depending on analytical derivatives of the cost function E, using $a_j \rightarrow a_j - \lambda_j \cdot \partial E / \partial a_j$, and similarly for and $\beta_j$ and $\rho_j$, with suitable factors $\lambda_j$.

Derivatives of texture and shape (Equation 1) yield derivatives of 2D locations $(\overline{P}_{x,k}, \overline{P}_{y,k})^T$, surface normals $n_k$, vectors $v_k$ and $r_k$, and $I_{model,k}$ (Equation 6) using chain rule. From Equation (7), partial derivatives $\partial E_K / \partial a_j$, $\partial E_K / \partial \beta_j$ and $\partial E_K / \partial pj$ can be obtained.

Coarse-to-Fine: To avoid local minima, the algorithm follows a coarse-to-fine strategy in several respects:

a) The first set of iterations is performed on a down-sampled version of the input image with a low resolution morphable model.
b) We start by optimizing only the first coefficients $a_j$ and $\beta_j$, controlling the first principal components, along with all parameters $\rho_j$. In subsequent iterations, more and more principal components are added.
c) Starting with a relatively strong weight on prior probability in equation (5), which ties the optimum towards the prior expectation value, we reduce this weight (or equivalently $s_N$) to obtain maximum matching quality.
d) In the last iterations, the face model is broken down into segments (Section II). With parameters $\rho_j$ fixed, coefficients $\alpha_j$ and $\beta_j$ are optimized independently for each segment. This increased number of degrees of freedom significantly improves facial details.

Figure 5:
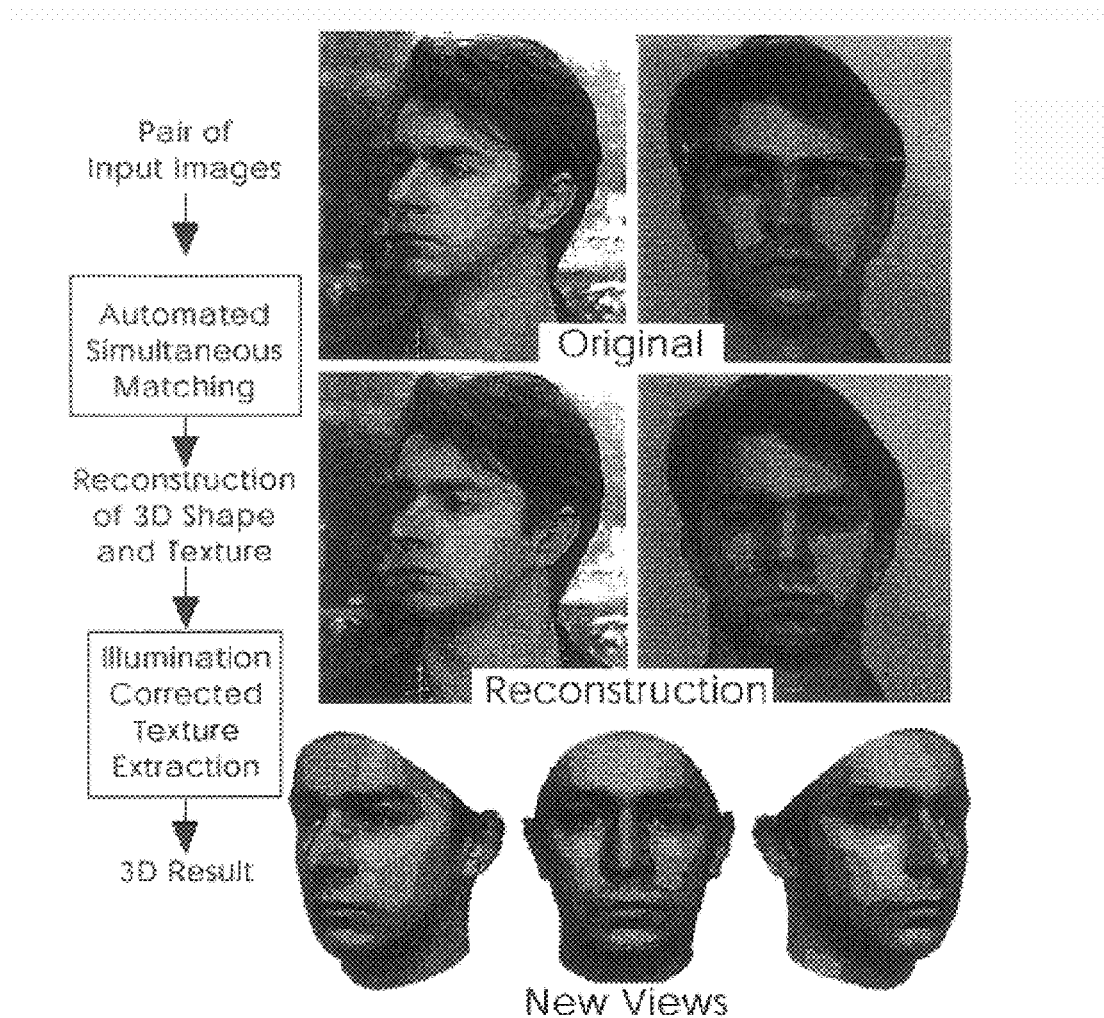
FIG. 5: a flow chart of the simultaneous reconstruction of a 3D shape and texture of a new face from two images.

Multiple Images: It is straightforward to extend this technique to the case where several images of a person are available (FIG. 5). FIG. 5 illustrates a simultaneous reconstruction of 3D shape and texture of a new face from two images taken under different conditions in the center row, the 3D face is rendered on top of the input images. FIG. 5 demonstrates an essential advantage of the invention. The image processing method can be implemented with one or more input images. There are no restrictions with regard to the imaging conditions of the input images. This is a particular difference against the 3D reconstruction on the basis of image pairs being taken with a parallax (pseudo-stereo images).

While shape and texture are still described by a common set of $\alpha_j$ and $\beta_j$, there is now a separate set of $\rho_j$ for each input image. $E_I$ is replaced by a sum of image distances for each pair of input and model images, and all parameters are optimized simultaneously.

Illumination-Corrected Texture Extraction: Specific features of individual faces that are not captured by the morphable model, such as blemishes, are extracted from the image in a subsequent texture adaptation process. Extracting texture from images is a technique widely used in constructing 3D models from images (e.g. [26]). However, in order to be able to change pose and illumination, it is important to separate pure albedo at any given point from the influence of shading and cast shadows in the image. In the inventive approach, this can be achieved because the matching procedure provides an estimate of 3D shape, pose, and illumination conditions. Subsequent to matching, we compare the prediction $I_{mod,i}$ for each vertex i with $I_{input}(p_{x,i}, p_{y,i})$, and compute the minimum change in texture $(R_i, G_i, B_i)$ that accounts for the difference. In areas occluded in the image, we rely on the prediction made by the model. Data from multiple images can be blended using methods similar to [26].

III.1 Matching a Morphable Model to 3D Scans

The method described above can also be applied to register new 3D faces. Analogous to images, where perspective projection P: $R^3 \rightarrow R^2$ and an illumination model define a colored image $I(x, y) = (R(x, y), G(x, y), B(x, y))^T$, laser scans provide a two-dimensional cylindrical parameterization of the surface by means of a mapping C: $R^3 \rightarrow R^2$, $(x,y,z) \rightarrow (h, \phi)$. Hence, a scan can be represented as $$I(h, \phi) = (R(h, \phi), G(h, \phi), B(h, \phi), r(h, \phi)))^T. \quad (8)$$

In a face (S, T), defined by shape and texture coefficients $\alpha_j$ and $\beta_j$ (Equation 1), vertex i with texture values $(R_i, G_i, B_i)$ and cylindrical coordinates $(r_i, h_i, \phi_i)$ is mapped to $I_{model}(h_i, \phi_i) = (R_i, G_i, B_i, r_i)^T$.

The matching algorithm from the previous section now determines $\alpha_j$ and $\beta_j$ minimizing $$E = \sum_{h, \phi} \|I_{input}(h, \phi) - I_{model}(h, \phi)\|^2.$$

IV Building a Morphable Model

In this section, it is described how to build the morphable model from a set of unregistered 3D prototypes, and to add a new face to the existing morphable model, increasing its dimensionality.

A key problem is to compute a dense point-to-point correspondence between the vertices of the faces. Since the method described in Section III.1 finds the best match of a given face only within the range of the morphable model, it cannot add new dimensions to the vector space of faces. To determine residual deviations between a novel face and the best match within the model, as well as to set unregistered prototypes in correspondence, we use an optic flow algorithm that computes correspondence between two faces without the need of a morphable model [32]. The following section summarizes the technique as adapted to the invention.

IV.1 3D Correspondence Using Optical Flow

Initially designed to find corresponding points in grey-level images I(x, y), a gradient-based optic flow algorithm is modified to establish correspondence between a pair of 3D scans I(h, φ) (Equation 8), taking into account color and radius values simultaneously. The algorithm computes a flow field (δh(h,φ),δφ(h,φ)) that minimizes differences of $\|I_1(h, \phi)-I_2(h+\delta h(\phi+\delta \phi))\|$ in a norm that weights variations in texture and shape equally. Surface properties from differential geometry, such as mean curvature, may be used as additional components in I(h, φ).

On facial regions with little structure in texture and shape, such as forehead and cheeks, the results of the optical flow algorithm are sometimes spurious. We, therefore, performed a smooth interpolation based on simulated relaxation of a system of flow vectors that are coupled with their neighbors. The quadratic coupling potential is equal for all flow vectors. On high-contrast areas, components of flow vectors orthogonal to edges are bound to the result of the previous optic flow computation. The system is otherwise free to take on a smooth minimum-energy arrangement. Unlike simple filtering routines, our technique fully retains matching quality wherever the flow field is reliable. Optical flow and smooth interpolation are computed on several consecutive levels of resolution.

Constructing a morphable face model from a set of unregistered 3D scans requires the computation of the flow fields between each face and an arbitrary reference face. Given a definition of shape and texture vectors $S_{ref}$ and $T_{ref}$ for the reference face, S and T for each face in the database can be obtained by means of the point-to-point correspondence provided by (δh(h, φ), δφ(h, φ).

IV.2 Further Improving the Model

Because the optic flow algorithm does not incorporate any con-straints on the set of solutions, it could fail on some of the more unusual faces in the database. Therefore, we modified an algorithm to iteratively improve correspondence, on the basis of a method that has been used previously to build linear image models [33].

The basic recursive step: Suppose that an existing morphable model is not powerful enough to match a new face and thereby find correspondence with it. The idea is first to find rough correspondences to the novel face using the (inadequate) morphable model and then to improve the correspondence by using an optical flow algorithm.

Starting from an arbitrary face as the temporary reference, preliminary correspondence between all other faces and this reference is computed using the optic flow algorithm. On the basis of these correspondences, shape and the texture vectors S and T can be computed. Their average serves as a new reference face. The first morphable model is then formed by the most significant components as provided by a standard PCA decomposition. The current morphable model is now matched to each of the 3D faces according to the method described in Section III.1. Then, the optic flow algorithm computes correspondence between the 3D face and the approximation provided by the morphable model. Combined with the correspondence implied by the matched model, this defines a new correspondence between the reference face and the example.

Iterating this procedure with increasing expressive power of the model (by increasing the number of principal components) leads to reliable correspondences between the reference face and the examples, and finally to a complete morphable face model.

V Imaging Processing System

Figure 8:
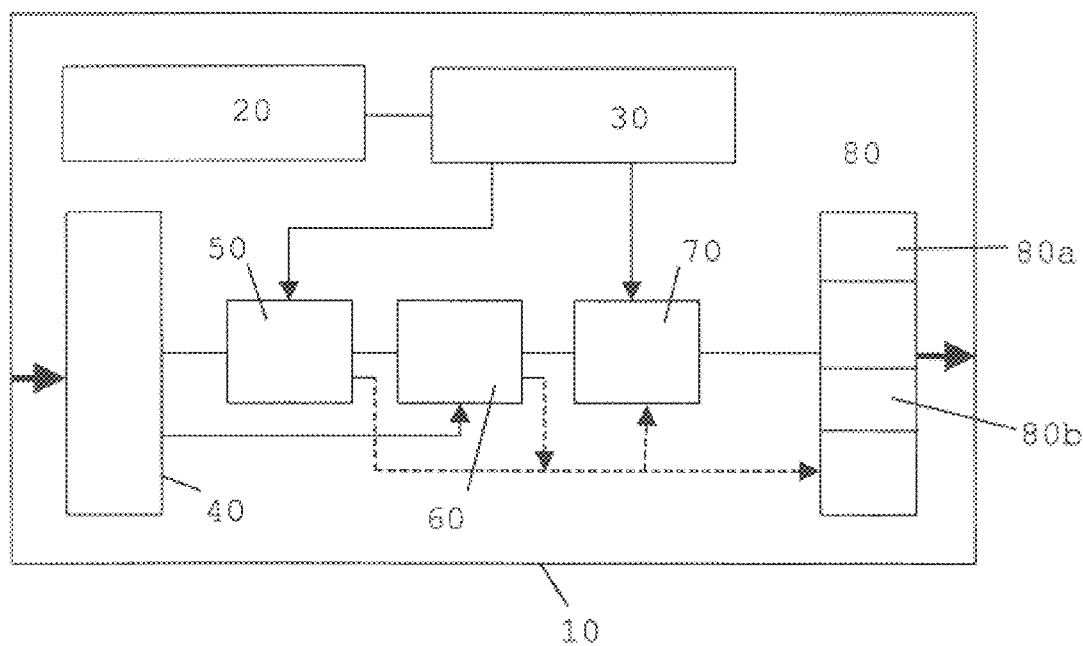
FIG. 8: a schematic illustration of an image processing system according to the invention.

One embodiment of a basic configuration of an image processing system according to the invention is schematically illustrated in FIG. 8. The image processing system 10 contains a 3D database 20, a model processor 30, a 2D input circuit 40, an object analyzer 50, a back-projection circuit 60, a modeler circuit 70 and a 3D output circuit 80. Further details of an image processing system are not shown which as such are known (e.g. controlling means, keyboard input means, display means and the like).

The 3D database 20 contains the structure data of a plurality of objects (e.g. human faces) being obtained from a suitable optical object detection, e.g. on the basis of laser scans. The 3D database 20 is connected to the model processor 30 which is adapted to perform the data processing steps on the basis of the methods outlined above. As a result, the model processor 30 delivers, in particular, an average face (e.g. such as FIG. 4, top row, right) to the object analyzer 50 as well as reference data to the modeler circuit 70. The 2D input circuit 40 is adapted to receive one or more input images in an appropriate format, e.g. photographs, synthesized images or the like. The 2D input circuit 40 is connected to the object analyzer 50 matching the morphable model received from the model processor 30 the input image(s). As a result, the object analyzer 50 generates a 3D model of the input image which is delivered to the back-protection circuit 60 or directly to the modeler circuit 70 or to the 3D output circuit 80. On the basis of the 3D model received from the object analyzer 50 and the original color data received from the 2D input circuit 40, the back-projection circuit 60 performs a model correction as outlined above. The corrected model is delivered to the modeler circuit 70 or directly to the 3D output circuit 80. Finally, the modeler circuit 70 is adapted to introduce amended facial features to the (corrected) 3D model using the input of the model processor 30 as outlined above.

VI Results and Modifications

According to the invention a morphable face model has been built by automatically establishing correspondence between all of e.g. 200 exemplar faces. The interactive face modeling system enables human users to create new characters and to modify facial attributes by varying the model coefficients. The modifying facial attributes comprise e.g. gaining or loosing weight, frowning or smiling or even "being forced to smile". Within the constraints imposed by prior probability, there is a large variability of possible faces, and all linear combinations of the exemplar faces look natural.

Figure 6:
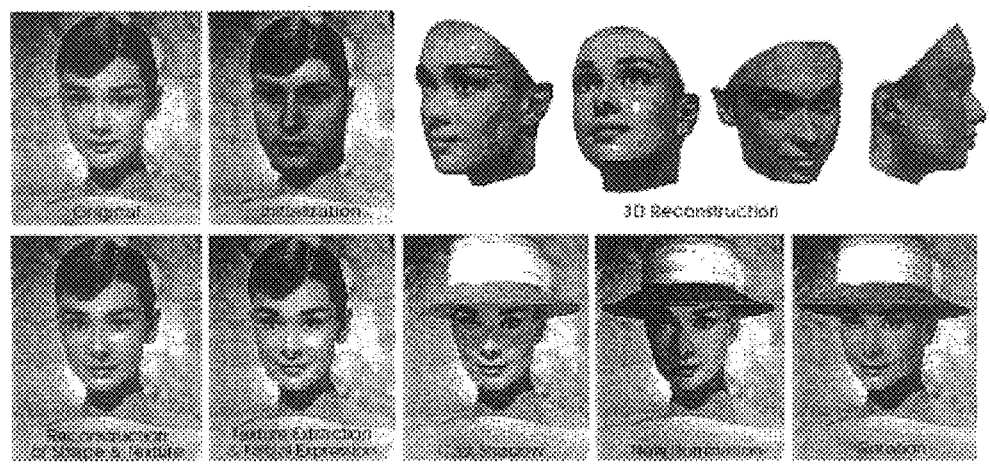
FIG. 6: an illustration of the generation of new images with modified rendering parameters.

The expressive power of the morphable model has been tested by automatically reconstructing 3D faces from photographs of arbitrary Caucasian faces of middle age that were not in the database. The images were either taken by us using a digital camera (FIG. 4, 5), or taken under arbitrary unknown conditions (FIG. 6).

In all examples, we matched a morphable model built from the first 100 shape and the first 100 texture principal components that were derived from the whole dataset of 200 faces. Each component was additionally segmented in 4 parts (see FIG. 2). The whole matching procedure was performed in $10^5$ iterations. On an SGI R10000 processor, computation time was 50 minutes.

Reconstructing the true 3D shape and texture of a face from a single image is an ill-posed problem. However, to human observers who also know only the input image, the results obtained with our method look correct. When compared with a real image of the rotated face, differences usually become only visible for large rotations of more than about 60°.

There is a wide variety of applications for 3D face reconstruction from 2D images. As demonstrated in FIG. 6 the results can be used for automatic post-processing a face within the original picture or movie sequence.

Knowing the 3D shape of a face in an image provides a segmen-tation of the image into face area and background. The face can be combined with other 3D graphic objects, such as glasses or hats, and then be rendered in front of the background, computing cast shadows or new illumination conditions (FIG. 6). Furthermore, we can change the appearance of the face by adding or subtracting specific attributes. If previously unseen backgrounds become visible, the holes can be filled with neighboring background pixels.

Figure 7:
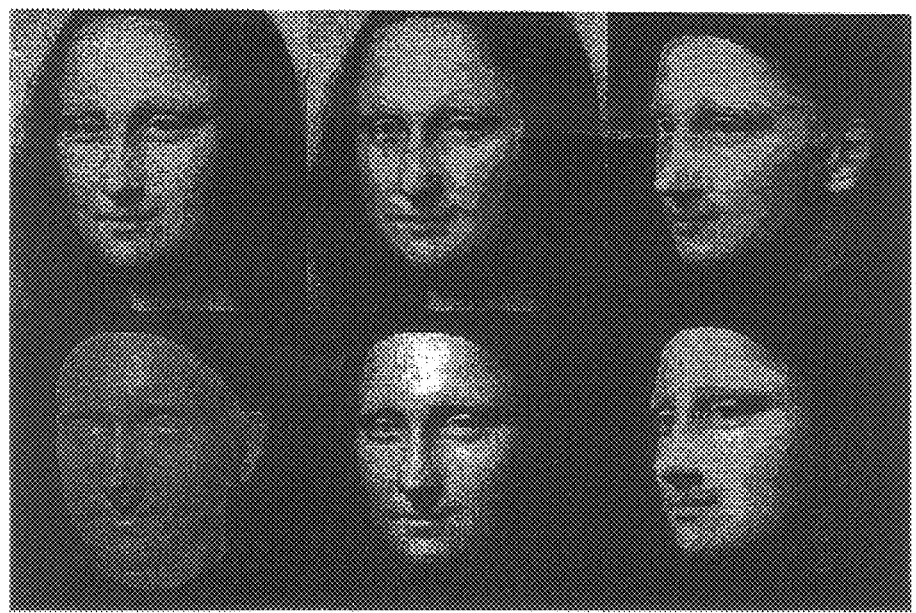
FIG. 7: an illustration of the reconstruction of a 3D face of Mono Lisa on the basis of the invention.

We also applied the method to paintings such as Leonardo's Mona Lisa (FIG. 7). FIG. 7 illustrates a reconstructed 3D face of Mona Lisa (top center and right). For modifying the illumination, color differences (bottom left) are computed on the 3D face, and then added to the painting (bottom center). Additional warping generated new orientations (bottom right). Illumination-corrected texture extraction, however, is difficult here, due to unusual (maybe unrealistic) lighting. We, therefore, applied a different method for transferring all details of the painting to novel views. For new illumination (FIG. 7, bottom center), we rendered two images of the reconstructed 3D face with different illumination, and added differences in pixel values (FIG. 7, bottom left) to the painting. For a new pose (bottom right), differences in shading are transferred in a similar way, and the painting is then warped according to the 2D projections of 3D vertex displacements of the reconstructed shape.

According to the invention the basic components for a fully automated face modeling system based on prior knowledge about the possible appearances of faces are presented. Further extensions are contemplated under the following aspects:

Issues of implementation: We can speed up our matching method by implementing a simplified Newton-method for minimizing the cost function (Equation 5). Instead of the time consuming computation of derivatives for each iteration step, a global mapping of the matching error into the parameter space can be used [8].

Data reduction applied to shape and texture data will reduce redundancy of our representation, saving additional computation time.

Extending the database: While the current database is sufficient to model Caucasian faces of middle age, it can be extended to children, to elderly people as well as to other races.

Additional 3D face examples representing the time course of facial expressions and visemes. the face variations during speech can also be incorporated.

The laser scanning technology can further be extended to the collection of dynamical 3D face data. The development of fast optical 3D digitizers [25] allows for application of the method to streams of 3D data during speech and facial expressions.

Extending the face model: The current morphable model for human faces is restricted to the face area, because a sufficient 3D model of hair cannot be obtained with our laser scanner. For animation, the missing part of the head can be automatically replaced by a standard hair style or a hat, or by hair that is modeled using interactive manual segmentation and adaptation to a 3D model [28, 26]. Automated reconstruction of hair styles from images is one of the future challenges.

Further applications of the invention are given in the field of modelling images of three-dimensional objects other than human faces. These objects comprise e.g. complete human bodies, bodies or faces from animals, technical objects (as cars, furniture) and the like.

LIST OF REFERENCES

[1] T. Akimoto, Y. Suenaga, and R. S. Wallace. Automatic creation of 3D facial models. *IEEE Coomputer Graphics and Applications*, 13(3):16–22, 1993.

[2] P. Bergeron and P. Lachapelle. Contolling facial expressions and body move-ments. In *Advanced Computer Animation, SIGGRAPH '85 Tutorials* volume 2,pages 61–79, New York. 1985. ACM.

[3] D. Beymer and T. Poggio. Image representation for visual learning. *Science,*272:1905–1909, 1996.

[4] D. Beymer, A. Shashua, and T. Poggio. Example-based image analysis and syn-thesis. A.I. Memo No. 1431, Artificial Intelligence Laboratory, Massachusetts Institute of Technology, 1993.

[5] S. E. Brennan. The caricature generator. *Leonardo,* 18:170–178, 1985.

[6] P. J. Burt and E. H. Adelson. Merging images through pattern decomposition. In *Applications of Digital Image Processing VIII,* number 575, pages 173–181. SPIE The International Society for Optical Engeneering, 1985.

[7] C. S. Choi, T. Okazaki, H. Harashima, and T. Takebe. A system of analyzing and synthesizing facial images. In *Proc. IEEE Int. Symposium of Circuit and Systems (ISCAS*91), pages 2665–2668, 1991.

[8] T. F. Cootes, G. J. Edwards, and C. J. Taylor. Actice appearance models. In Burkhardt and Neumann, editors, *Computer Vision~ECCV'98 Vol. II,* Freiburg, Germany, 1998. Springer, Lecture Notes in Computer Science 1407.

[9] D DeCarlos, D. Metaxas, and M. Stone. An anthopo-metric face model using vari-ational techniques. In *Computer Graphics Proceedings SIGGRAPH'98*, pages 67–74, 1998.

[10] S. Di Paola. Extending the range of facial types. *Journal of Visualization and Computer Animation,* 2(4):129–131, 1991.

[11] G. J. Edwards, A. Lanitis, C. J. Taylor, and T. F. Cootes. Modelling the variability in face images. In *Proc. of the 2nd Int. Conf on Automatic Face and Gesture Recognition,* IEEE Comp. Soc. Press, Los Alamitos, Calif., 1996.

[12] L. G. Farkas. *Anthropometry of the Head and Face.* RavenPress, New York, 1994.

[13] B. Guenter, C. Grimm, D. Wolf, H. Malvar, and F. Pighin. Making faces. In *Computer Graphics Proceedings SIGGRAPH '98*, pages 55–66, 1998.

[14] I. J. Jollife. *Principal Component Analysis.* Springer-Verlag, New York, 1986.

[15] M. Jones and T. Poggio. Multidimensional morphable models: A framework for representing and matching object classes. In *Proceedings of the Sixth Interna-tional Conference on Computer Vision,* Bombay, India, 1998.

[16] A. Lanitis, C. J. Taylor, and T. F. Cootes. Automatic interpretation and coding of face images using flexible models. *IEEE Transactions on Pattern Analysis and Machine Intelligence,* 19(7):743–756, 1997.

[17] Y. C. Lee, D. Terzopoulos, and Keith Waters. Constructing physics-based fa-cial models of individuals. *Visual Computer,* Proceedings of Graphics Interface '93:1–8, 1993.

[18] Y. C. Lee, D. Terzopoulos, and Keith Waters. Realistic modeling for facial animation. In *SIGGRAPH '95 Conference Proceedings,* pages 55–62, Los Angels, 1995. ACM.

[19] J. P. Lewis. Algorithms for solid noise synthesis. In *SIGGRAPH '89 Conference Proceedings,* pages 263–270. ACM, 1989.

[20] N. Magneneat-Thalmann, H. Minh, M. Angelis, and D. Thalmann. Design, transformation and animation of human faces. *Visual Computer,* 5:32–39, 1989.

[21] L. Moccozet and N. Magnenat-Thalmann. Dirichlet free-form deformation and their application to hand simulation. In *Computer Animation '97,* 1997.

[22] F. I. Parke and K. Waters. *Computer Facial Animation.* A K Peters, Wellesley, Mass., 1996.

[23] F. I. Parke. Computer generated animation offaces. In *ACM National Conference.* ACM, November 1972.

[24] F. I. Parke. A parametric model of human faces. Doctoral thesis, University of Utah, Salt Lake City, 1974.

[25] M. Petrow, A. Talapov, T. Robertson, A. Lebedev, A. Zhilyaev, and L. Polonskiy. Optical 3D digitizer: Bringing life to virtual world. *IEEE Computer Graphics and Applications,* 18(3):28–37, 1998.

[26] F. Pighin, J. Hecker, D. Lischinski, Szeliski R, and D. Salesin. Synthesizing re-alistic facial expressions from photographs. In *Computer Graphics Proceedings SIGGRAPH'98,* pages 75–84, 1998.

[27] S. Platt and N. Badler. Animating facial expression. *Computer Graphics,* 15(3):245–252, 1981.

[28] G. Sannier and N. Magnenat-Thalmann. A user-friendly texture-fitting method-ology for virtual humans. In *Computer Graphics International '97,* 1997.

[29] D. Terzopoulos and Keith Waters. Physically-based facial modeling, analysis, and animation. *Visualization and Computer Animation,* 1:73–80, 1990.

[30] Demetri Terzopoulos and Hong Qin. Dynamic NURBS with geometric con-straints to interactive sculpting. *ACM Transactions on Graphics,* 13(2):103–136, April 1994.

[31] J. T. Todd, S. M. Leonard, R. E. Shaw, and J. B. Pittenger. The perception of human growth. *Scientfic American,* 1242:106–114, 1980.

[32] T. Vetter and V. Blanz. Estimating coloured 3d face models from single images: An example based approach. In Burkhardt and Neumann, editors, *Computer Vision—ECCV'98 Vol II,* Freiburg, Germany, 1998. Springer, Lecture Notes in Computer Science 1407.

[33] T. Vetter. M. J. Jones, and T. Poggio. A bootstrapping algorithm for learning linear models of object classes. In *IEEE Conference on Computer Vision and Pattern Recognition—CVPR '97,* Puerto Rico, USA, 1997. IEEE Computer Society Press.

[34] T. Vetter and T. Poggio. Linear object classes and image synthesis from a single example image. *IEEE Transactions on Pattern Analysis and Machine Intelligence,* 19(7):733–742, 1997.

[35] Keith Waters. A muscle model for animating three-dimensional facial expression. *Computer Graphics,* 22(4):17–24, 1987.

An alternate configuration of FIG. 6 includes matching a morphable model to a single image (1) of aface results in a 3D shape (2) and a texture map estimate. The texture estimate can be improved by additional texture extraction (4). The 3D model is rendered back into the image after changing facial attributes, such as gaining (3) and loosing weight (5), frowning (6), or being forced to smile (7).

What is claimed is:

1. A method of processing an image of a three-dimensional object comprising:

providing a morphable object model derived from a plurality of 3D images, said morphable object model being a multidimensional 3D morphing function comprising coefficients that are image attributes of said object;

matching the morphable object model to at least one 2D object image to obtain a matched object model, said matching comprising a non-linear optimization of said coefficients on the basis of parameters comprising orientation of said object and illumination conditions;

subjecting the matched object model to a back-projection to color data of the 2D input image of the object; and providing the matched morphable object model as a 3D representation of the object.

2. The method according to claim 1, wherein the matched morphable object model is subjected to a modelling step to modify at least one object feature.

3. The method according to claim 1, wherein the objects are selected from the group consisting of human faces, animal faces, human bodies, animal bodies and technical objects.

4. A method of recognizing an object, wherein a 3D model of the object to be recognized is processed with a method according to claim 1.

5. A method of synthesizing a 3D model of a face with certain facial attributes with the method according to claim 1.

6. A method of processing an image of a three-dimensional object comprising:

providing a morphable object model derived from a plurality of 3D images;

matching the morphable object model to at least one 2D object image to obtain a matched object model;

subjecting the matched object model to a back-projection to color data of the 2D input image of the object, wherein the back-projection yields an illumination correction for obtaining color data of a surface of the object providing the matched morphable object model as a 3D representation of the object.

7. The method according to claim 6, wherein the color corrected data are subjected to an adapation to changed illumination conditions.

* * * * *